H. BULLERDICK.
DRIER FOR SEED CORN.
APPLICATION FILED JULY 13, 1917.
1,274,849.
Patented Aug. 6, 1918.
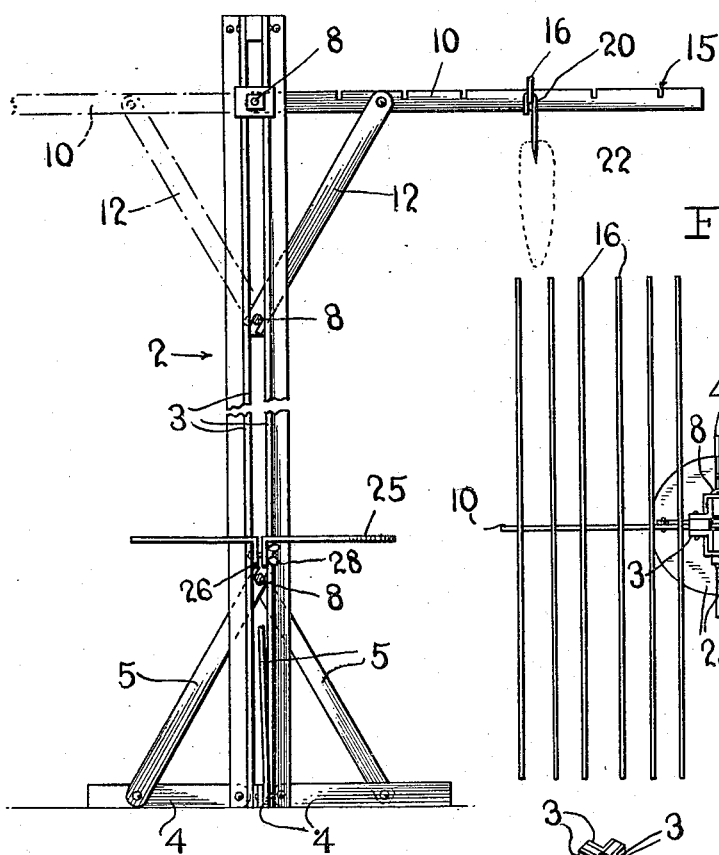
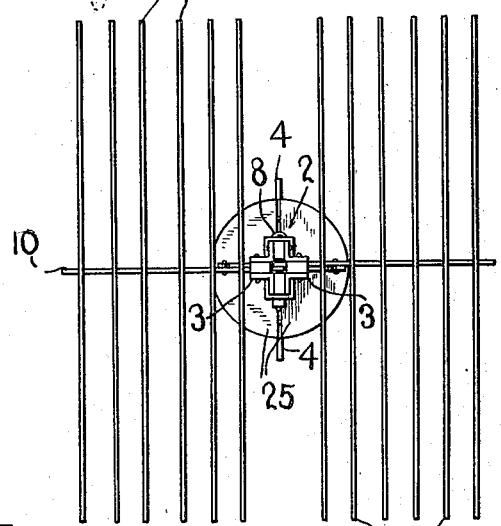
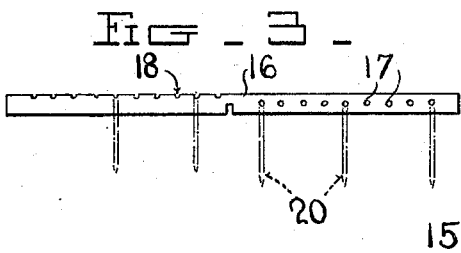
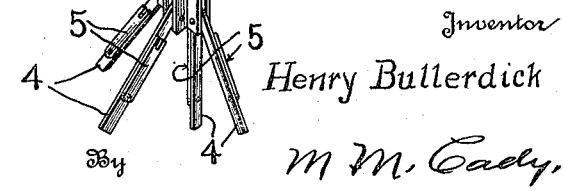
Inventor
Henry Bullerdick
By M. M. Cady,
Attorney

UNITED STATES PATENT OFFICE.

HENRY BULLERDICK, OF BELLEVUE, IOWA.

DRIER FOR SEED-CORN.

1,274,849.  Specification of Letters Patent. Patented Aug. 6, 1918.

Application filed July 13, 1917. Serial No. 180,323.

*To all whom it may concern:*

Be it known that I, HENRY BULLERDICK, a citizen of the United States, residing at Bellevue, in the county of Jackson and State of Iowa, have invented certain new and useful Improvements in Driers for Seed-Corn, of which the following is a specification.

My invention relates to driers, with special reference to driers for seed corn, and the leading object is to provide a seed corn drier that shall be inexpensive, simple in construction, durable, can be readily folded into a small space, and shall provide protection to the drying corn from the ravages of rats and other corn eating animals.

The mode of construction and manner of use will be fully set out and described in the following specification and illustrated in the drawings accompanying the same and forming a part hereof in which—

Figure 1 is a side elevation of the main post, radial arms and braces with all the strips removed, except one.

Fig. 2 is a top view when in use.
Fig. 3 is a side elevation of one strip with hooks thereon and in use.

Fig. 4 is a perspective view of the parts shown in Fig. 1 when partly folded.

Like characters denote corresponding parts in each of the figures.

In the drawings, 2 represents the main post which preferably consists of four angle bars 3, united together. To the lower end of 2, there are hinged four feet or standards 4, that comprise the base on which the drier stands when in use. To these feet 4, are pivotally attached braces 5, which braces are removably attached to the main post by engagement with a bolt 7, secured in the post.

At certain intervals against the post 2, are hinged or pivoted cross or radial arms 10, by bolts 8, preferably by clamping the arms between the angle bars, or they may be held together by the bolts 8, passing through the ends of these arms. These arms extend at right angles on opposite sides of the post, and may be folded against the sides of the post as shown in Fig. 4. To the arms 10, are pivotally attached braces 12, which removably engage, at their lower ends, the top of the pins 8.

The radial arms 10, extend on opposite sides of the post and are provided with U shaped notches 15, in which are secured strips 16, running at right angles to the arms, on which strips the corn is hung to be dried. Each strip is provided with a U shaped notch 13 in its lower edge which engages with a notch 15 in the radial arm 10 and holds the strip 16 in a horizontal position. The strips may be provided with holes 17, or notches 18, as shown in Fig. 3.

To hang the corn on these strips, there are provided metal hangers 20, pointed at their lower ends 19, the better adapted to be inserted in the pith of the ear 22, and said hangers formed into hooks 21, at their upper ends, adapted to engage the holes 17, or the notches 18, and suspend the corn from the strips 16, as shown in Fig. 3.

For the purpose of protecting the drying corn from rats and other corn destroying animals, there is attached around the post a circular metal plate 25, with its under surface smooth, being tinned or nickel plated. This plate is formed in two sections with the inner edge 26, of each section at right angles and preferably formed into a shield shape, and is removably secured around the post by the hand screws 28, passing through the inner edges 26. This will prevent all animals from climbing up to where the corn is drying.

To fold up the drier when not in use, the operator first removes the strips 16, and the plate 25, then releases the bolts and disengages the braces at their lower ends and folds upward or downward the radial arms 10, until the arms and braces come close to the sides of the post 2, as shown in Fig. 4. And at the lower end, the arms or feet 4, and braces 5, will be brought into position as shown in dotted lines at the bottom of Fig. 1. In this manner the drier may be folded into a small space when not in use.

Having now described my invention what I claim is:

1. In a device of the character described, a central post, radial arms hinged to the post, braces pivoted at one end to the arms and at their other ends removably secured to the post, strips removably secured to the arms, and hangers adapted to engage the pith of the ears of corn and suspend them from the strips.

2. In a device of the character described, a central metal post formed of angle bars united together, radial arms hinged to the post, braces pivoted to the arms at one end and removably secured in the post at their other ends, strips removably secured in the radial arms at right angles thereto, and metal hangers adapted to engage the cobs of corn and suspend the ear from the strips.

3. In a device of the character described, a central metal post composed of channel bars united together, radial arms hinged to the post and provided with notches, braces pivotally connected at their upper ends to the outward ends of the arms and removably connected at their lower ends to the central post, strips secured in the notches in the arms, and hangers adapted to be inserted in the pith of the ear of corn and hung on the strips.

4. In a device of the character described, a metal post composed of four channel bars with channels turned outwardly, radial arms hinged to the central post and provided with U shaped notches on their upper edges, strips secured in the notches, and hangers adapted to engage the ear of corn and suspend the ears from the strips.

5. In a device of the character described, a central post formed of four angle bars removably united together, flat radial arms hinged to the post on opposite sides and provided with U shaped notches in their upper edges, braces pivoted at their upper ends to the outer ends of the arms and at their lower ends engaging a bolt in the body of the post, strips secured in the notches in the radial arms, and hangers of hook shape at their upper ends adapted to engage the strips and suspend the corn therefrom and having their lower ends pointed to better be inserted in the cob.

In testimony whereof I affix my signature in the presence of two witnesses.

HENRY BULLERDICK.

Witnesses:
M. W. MOULTON,
ARTHUR KUCHEMENS.

Copies of this patent may be obtained for five cents each, by addressing the "Commissioner of Patents, Washington, D. C."